(12) United States Patent
Takada et al.

(10) Patent No.: US 11,369,925 B2
(45) Date of Patent: Jun. 28, 2022

(54) COMPOSITE HOLLOW-FIBER MEMBRANE AND PRODUCTION METHOD THEREFOR

(71) Applicant: TORAY INDUSTRIES, INC., Tokyo (JP)

(72) Inventors: Koichi Takada, Shiga (JP); Gohei Yamamura, Shiga (JP); Hiroki Eimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 70 days.

(21) Appl. No.: 16/489,276

(22) PCT Filed: Feb. 27, 2018

(86) PCT No.: PCT/JP2018/007366
§ 371 (c)(1),
(2) Date: Aug. 27, 2019

(87) PCT Pub. No.: WO2018/159642
PCT Pub. Date: Sep. 7, 2018

(65) Prior Publication Data
US 2020/0061545 A1    Feb. 27, 2020

(30) Foreign Application Priority Data
Feb. 28, 2017  (JP) .............................. JP2017-036089

(51) Int. Cl.
*B01D 69/08* (2006.01)
*B01D 69/12* (2006.01)
(Continued)

(52) U.S. Cl.
CPC .......... *B01D 69/088* (2013.01); *B01D 69/081* (2013.01); *B01D 69/12* (2013.01); *B01D 71/16* (2013.01); *B01D 71/56* (2013.01)

(58) Field of Classification Search
CPC .......... B01D 2325/022; B01D 2325/36; B01D 69/02; B01D 69/08; B01D 71/26;
(Continued)

(56) References Cited

U.S. PATENT DOCUMENTS 5,228,994 A * 7/1993 Tkacik .................. B01D 69/12
                                                    210/500.29
5,395,570 A * 3/1995 Kopp .................. B01D 67/0025
                                                    264/209.1
(Continued)

FOREIGN PATENT DOCUMENTS

CN    103154107 A    6/2013
CN    105722585 A    6/2016
(Continued)

OTHER PUBLICATIONS

International Search Report, issued in PCT/JP2018/007366, PCT/ISA/210, dated May 29, 2018.
(Continued)

*Primary Examiner* — Ana M Fortuna
(74) *Attorney, Agent, or Firm* — Birch, Stewart, Kolasch & Birch, LLP

(57) ABSTRACT

The present invention addresses the problem of providing: a composite hollow-fiber membrane having high permeability and high membrane strength; and a production method therefor. The present invention pertains to a composite hollow-fiber membrane that at least has a layer (A) and a layer (B), wherein the layer (A) contains a thermoplastic resin, the layer (A) is provided with a co-continuous structure comprising voids and a phase containing the thermoplastic resin, the co-continuous structure has a structural cycle of 1-1000 nm, and the hole area rate $H_A$ of the layer (A) and the hole area rate $H_B$ of the layer (B) fulfill the relation: $H_A < H_B$.

6 Claims, 1 Drawing Sheet phase containing thermoplastic resin voids

(51) Int. Cl.
  *B01D 71/16* (2006.01)
  *B01D 71/56* (2006.01)
(58) Field of Classification Search
  CPC ................. B01D 69/088; B01D 2325/02;
                              B01D 69/087; B01D 71/64
  See application file for complete search history.

(56) References Cited

U.S. PATENT DOCUMENTS

| | | | | |
|---|---|---|---|---|
| 10,478,782 | B2* | 11/2019 | Yamamura | ............ B01D 69/081 |
| 10,639,595 | B2* | 5/2020 | Takada | .................. B01D 69/081 |
| 10,799,837 | B2* | 10/2020 | Yamamura | ............. B01D 69/08 |
| 10,888,822 | B2* | 1/2021 | Yamamura | ............. B01D 71/52 |
| 2005/0098494 | A1* | 5/2005 | Mullette | .................. D01D 5/24 |
| | | | | 210/500.27 |
| 2009/0283469 | A1 | 11/2009 | Ariji et al. | |
| 2011/0114559 | A1 | 5/2011 | Fislage et al. | |
| 2012/0125850 | A1* | 5/2012 | Fujimura | ............. B01D 69/087 |
| | | | | 210/650 |
| 2013/0184145 | A1 | 7/2013 | Takahashi et al. | |
| 2017/0296984 | A1 | 10/2017 | Yamamura et al. | |
| 2018/0065093 | A1 | 3/2018 | Takada et al. | |
| 2018/0117537 | A1* | 5/2018 | Yamamura | ............ B01D 69/081 |
| 2020/0197880 | A1 | 6/2020 | Takada et al. | |

FOREIGN PATENT DOCUMENTS

| | | |
|---|---|---|
| EP | 2 033 705 A1 | 3/2009 |
| JP | 4-65505 A | 3/1992 |
| JP | 6-319967 A | 11/1994 |
| JP | 2007-185562 A | 7/2007 |
| JP | 2011-235204 A | 11/2011 |
| JP | 2012-149244 A | 8/2012 |
| JP | 2015-73916 A | 4/2015 |
| WO | WO 2009/083260 A1 | 7/2009 |
| WO | WO 2015/041286 A1 | 3/2015 |
| WO | WO 2016/052675 A1 | 4/2016 |
| WO | WO 2016/159333 A1 | 10/2016 |
| WO | WO 2016/175308 A1 | 11/2016 |

OTHER PUBLICATIONS

Tokyo Kagaku Dojin "Polymer Alloy Foundation and Application (2nd Edition) (Chapter 10.1)" The Society of Polymer Science, pp. 324-325.
Written Opinion of the International Searching Authority, issued in PCT/JP2018/007366, PCT/ISA/237, dated May 29, 2018.
Extended European Search Report for European Application No. 18761328.6, dated Nov. 5, 2020.
Chinese Office Action and Search Report for Chinese Application No. 201880014456.X, dated Apr. 23, 2021, with an English translation.
Indian Office Action for Indian Application No. 201947034403, dated Jun. 2, 2021, with an English translation.
Korean Office Action for Korean Application No. 10-2019-7025137, dated Nov. 22, 2021, with English translation.
Office Action issued in Chinese Patent Application No. 201880014456.X dated Dec. 14, 2021.
Office Action issued in Japanese Patent Application No. 2018-515906 dated Mar. 31, 2022.

* cited by examiner

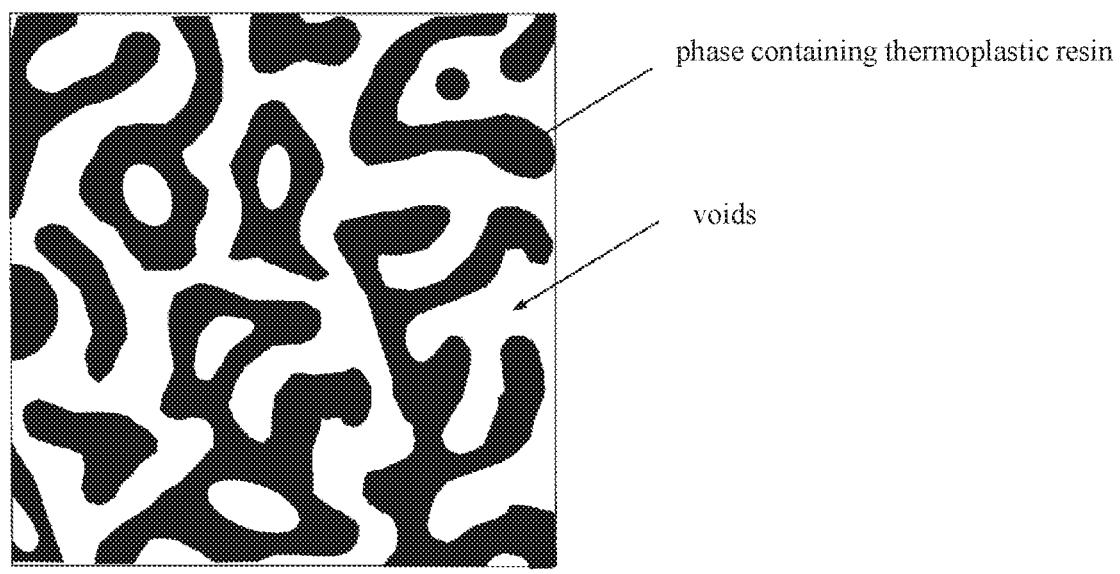

COMPOSITE HOLLOW-FIBER MEMBRANE AND PRODUCTION METHOD THEREFOR

TECHNICAL FIELD

The present invention relates to a hollow-fiber membrane having high permeation performance and high membrane strength, and a method for producing the same.

BACKGROUND ART

Hollow-fiber membranes are used in a wide range of fields such as water treatment membranes for removing suspended solids and ions from river water, seawater and lower wastewater so as to produce industrial water and drinking water, medical membranes for artificial kidneys and plasma separation, membranes for food and beverage industry such as fruit juice concentration, and gas separation membranes for separating carbon dioxide.

Most hollow-fiber membranes are made of thermoplastic resins. Among these, cellulose-based resins are widely used as hollow-fiber membranes for water treatment or the like because they have permeation performance due to their hydrophil icily and have chlorine resistance performance of being resistant to chlorine-based bactericides.

For example, Patent Literature 1 discloses a technique for obtaining a hollow-fiber membrane by discharging a membrane forming solution including cellulose triacetate, a solvent, and a non-solvent into a coagulation liquid including a solvent, a non-solvent, and water to cause phase separation.

Patent Literature 2 discloses a technique for obtaining a hollow-fiber membrane by melt-kneading a resin composition containing a cellulose ester and a plasticizer, discharging the resin composition from a spinneret into the air to wind up a hollow-fiber and then eluting the plasticizer from the hollow-fiber.

CITATION LIST

Patent Literature

Patent Literature 1: JP-A-2011-235204
Patent Literature 2: WO 2016/52675

SUMMARY OF INVENTION

Technical Problem

In the technique described in Patent Literature 1, a so-called asymmetric membrane is obtained, in which the pore diameter is largely different in the membrane thickness direction. In the asymmetric membrane, a dense layer with a small pore diameter which exhibits separation performance is present near the surface layer of the membrane. In order to exhibit high permeation performance, it is necessary to make the thickness of the dense layer sufficiently thin, and it is necessary to make the pore diameter sufficiently large except for the dense layer. Due to the former, there is a problem that the membrane is likely to have defects during production and use, and due to the latter, there is a problem that the membrane strength is low.

In the technique described in Patent Literature 2, a separation membrane having high membrane strength with a uniform structure in the membrane thickness direction can be obtained, but because it is a so-called reverse osmosis membrane, it is necessary to apply very high pressure in order to exhibit the permeation performance, yet the permeation performance obtained is low.

In view of such a background of the conventional techniques, an object of the present invention is to provide a hollow-fiber membrane having high permeation performance and high membrane strength and a method for producing the same.

Solution to Problem

In order to solve the above-described problems, the present inventors made extensive and intensive investigations. As a result, it has been found that a hollow-fiber membrane which can solve the above-described problems can be provided by compositing a layer, which contains a thermoplastic resin and has a co-continuous structure including a phase containing the thermoplastic resin and voids, and a layer, which has an opening ratio larger than that of the above-described layer. The present invention is thus accomplished.

Namely, the hollow-fiber membrane according to the present invention is a composite hollow-fiber membrane including at least a layer (A) and a layer (B), in which the layer (A) contains a thermoplastic resin, the layer (A) includes a co-continuous structure including a phase containing the thermoplastic resin, and voids, the co-continuous structure has a structure period of 1 nm to 1000 nm, and an opening ratio $H_A$ of the layer (A) and an opening ratio $H_B$ of the layer (B) satisfy $H_A<H_B$.

Advantageous Effects of Invention

According to the present invention, a composite hollow-fiber membrane having high permeation performance and high membrane strength is provided. The composite hollow-fiber membrane according to the present invention can be preferably used for applications requiring high permeation performance and high membrane strength.

Specifically, the composite hollow-fiber membrane according to the present invention can be used for water treatment membrane for removing suspended solids, bacteria and viruses from river water, seawater, brackish water, sewage water, etc., medical membranes for artificial kidneys and plasma separation, membranes for food and beverage industry such as fruit juice concentration, gas separation membranes for separating exhaust gas or carbon dioxide, and electronics industry membranes such as fuel cell separators. As the type of the water treatment membrane, a microfiltration membrane, an ultrafiltration membrane or the like can be preferably used.

BRIEF DESCRIPTION OF DRAWINGS

FIG. 1 is a cross-sectional view schematically showing a co-continuous structure of a composite hollow-fiber membrane according to the present invention.

DESCRIPTION OF EMBODIMENTS

The composite hollow-fiber membrane according to the present embodiment is a composite hollow-fiber membrane including at least a layer (A) and a layer (B), in which the layer (A) contains a thermoplastic resin, and includes a co-continuous structure including a phase containing the thermoplastic resin, and voids, the co-continuous structure has a structure period of 1 nm to 1000 nm, and an opening ratio $H_A$ of the layer (A) and an opening ratio $H_B$ of the layer (B) satisfy $H_A<H_B$.

The composite hollow-fiber membrane according to the present invention may contain a liquid such as water therein in order to maintain its shape. However, in the following description, such a liquid for maintaining the shape is not considered as a constituent element of the composite hollow-fiber membrane.

(1) Resin Composition (a) (Resin Composition Constituting Layer (A))

The layer (A) of the composite hollow-fiber membrane according to the present invention contains a resin composition (a). The resin composition (a) can contain the components shown in the following (1-1) to (1-5).

(1-1) Thermoplastic Resin

The resin composition (a) constituting the layer (A) of the composite hollow-fiber membrane according to the present invention contains a thermoplastic resin. Particularly, the resin composition (a) preferably contains a thermoplastic resin as a main component. The term "main component" as used herein refers to, among all the components of the resin composition (a), particularly the component which is contained in the largest amount by weight.

Specific examples of the thermoplastic resin include: polyolefin resins such as polyethylene, polypropylene and polymethylpentene; polyester resins; polyamide resins; polyimide resins such as polyether imide and polyimide; acrylic resins such as poly(meth)acrylate; polyether resins such as polyacetal and polyphenylene oxide; polyphenylene sulfide; polyetheretherketone; polysulfone; polyvinyl acetate; and cellulose esters.

Among these, the thermoplastic resin of the present invention is preferably a hydrophilic resin from the viewpoint of good permeation performance. In the present invention, the hydrophilic resin refers to a resin containing a hydrophilic group in its constituent component and having a contact angle with water of 90° or less with respect to the film of the resin. It is more preferable that it is a hydrophilic resin whose contact angle respect to water is 60° or less. Here, the hydrophilic group is a hydroxyl group, a carboxyl group, a carbonyl group, an amino group or an amide group.

Among the thermoplastic resins exemplified above, those can be hydrophilic resins are polyester resins, polyamide resin, polyimide resins, acrylic resins, polyether resins, polyether ether ketone, polysulfone, polyvinyl acetate, and cellulose esters.

It is preferred that the layer (A) contains at least one compound selected from the group consisting of a cellulose ester, a polyamide resin and a polyester resin.

Specific examples of the cellulose ester include cellulose acetate, cellulose propionate, cellulose butyrate, a cellulose-mixed ester in which three hydroxyl groups present in the glucose unit of cellulose are blocked by two or more types of acyl groups, and a derivative thereof.

Specific examples of the cellulose-mixed ester include cellulose acetate propionate, cellulose acetate butyrate, cellulose acetate laurate, cellulose acetate oleate, and cellulose acetate stearate. Preferred are cellulose acetate propionate and cellulose acetate butyrate.

The weight average molecular weight (Mw) of the cellulose ester is preferably 50,000 to 250,000. When the Mw of the cellulose ester is 50,000 or more, the thermal decomposition of the cellulose ester during melting in producing the composite hollow-fiber membrane is prevented, and the membrane strength of the composite hollow-fiber membrane can reach a practical level. When the Mw of the cellulose ester is 250,000 or less, the melt viscosity does not become too high, so that stable melt spinning can be obtained.

The Mw of the cellulose ester is more preferably 60,000 to 220,000, and still more preferably 80,000 to 200,000. The weight average molecular weight (Mw) is a value calculated by GPC measurement. The calculation method will be described in detail in Examples.

Each cellulose-mixed ester exemplified has acetyl groups and other acyl groups (for example, a propionyl group, a butyryl group, a lauryl group, an oleyl group, a stearyl group, etc.). In the cellulose-mixed ester contained in the resin composition (a), it is preferred that the average degree of substitution of the acetyl group and other acyl groups satisfy the following formulae.

$1.0 \leq \{(\text{Average degree of substitution of acetyl group}) + (\text{Average degree of substitution of other acyl groups})\} \leq 3.0$ $0.1 \leq (\text{Average degree of substitution of acetyl group}) \leq 2.6$ $0.1 \leq (\text{Average degree of substitution of other acyl groups}) \leq 2.6$ When the above formulae are satisfied, a composite hollow-fiber membrane achieving both the separation performance and the permeation performance is accomplished. Further, when the above formulae are satisfied, good thermal flowability is likely to be accomplished when melting the cellulose ester, in the production of the composite hollow-fiber membrane. The average degree of substitution refers to the number of hydroxyl groups to which the acyl group (acetyl group+other acyl groups) is chemically bonded, among 3 hydroxyl groups present per glucose unit of the cellulose.

Examples of the polyamide resin include various polyamides obtained by ring-opening polymerization of various lactams, polycondensation of various diamines with various dicarboxylic acids, and polycondensation of various aminocarboxylic acids, or copolymerized amides obtained by combination of the ring-opening polymerization with the polycondensation. Specific examples of the polyamides and copolymerized amides include nylons such as nylon 6, nylon 66, nylon 610, nylon 46, nylon 612, nylon 11, nylon 12, a nylon 6/12 copolymer (a copolymer of ε-caprolactam and laurolactam) and a nylon 6/66 copolymer (a copolymer of ε-caprolactam and nylon salts of hexamethylenediamine and adipic acid), and are not limited thereto. In addition, two or more types of these polyamide resins can be kneaded and used.

The composite hollow-fiber membrane may contain, as a polyamide resin, only one type of compound, or may contain two or more types of compounds.

The composite hollow-fiber membrane preferably contains at least one of nylon 6 and nylon 66, among the polyamide resins described above as specific examples. Containing these polyamide resins contributes to accomplish a composite hollow-fiber membrane having high separation performance.

The weight average molecular weight (Mw) of the polyamide resin is preferably 10,000 to 1.000,000. When the Mw of the polyamide resin is 10,000 or more, thermal decomposition during melt spinning can be prevented, and the membrane strength of the composite hollow-fiber membrane can reach a practical level, and thus Mw of 10,000 or more is preferred. When the Mw of the polyamide resin is 1,000,000 or less, the melt viscosity can be prevented from being too high and stable melt spinning can be performed, and thus Mw of 1,000,000 or less is preferred. The Mw of the polyamide resin is more preferably 20,000 to 900,000, and still more preferably 30,000 to 800,000.

In the polyamide resin, the bond formed by polymerization is an amide bond. In particular, since cleavage of the main chain hardly occurs even in the case of being in contact with an alkali, the polyamide resin has good resistance to alkali, and thus is preferred.

Examples of the polyester resin include polyester resins having a glycol moiety and a dicarboxylic acid moiety, and polylactic acid polymers such as polylactic acid. The composite hollow-fiber membrane may contain, as a polyester resin, only one type of compound, or may contain two or more types of compounds.

As for the polyester resin having a glycol moiety and a dicarboxylic acid moiety, the glycol moiety is preferably a glycol having 18 or less carbon atoms, more preferably a glycol having 10 or less carbon atoms, and still more preferably a glycol having 5 or less carbon atoms from the viewpoint of permeation performance. It is preferred from the viewpoint of enhancing the durability against alkaline hydrolysis that the carbon number of the glycol moiety is 2 or more. Specific examples include: aliphatic dihydric alcohols such as ethylene glycol, 1,2-propylene glycol, 1,2-butanediol, 1,3-butanediol, 1,4-butanediol, 2-methyl-1,3-propanediol, neopentyl glycol, 1,5-pentanediol, 1,6-hexanediol, 2,2-diethyl-1,3-propanediol, 2,2,4-trimethyl-1,3-pentanediol, 2-ethyl-1,3-hexanediol, 1,9-nonanediol, 1,10-decanediol, 2-butyl-2-ethyl-1,5-propanediol, and 1,12-octadecanediol; and polyalkylene glycols such as dipropylene glycol. These glycols may be used alone or in combination of two or more thereof.

Examples of the dicarboxylic acid moiety include terephthalic acid, isophthalic acid, and naphthalene dicarboxylic acid, and are not particularly limited. The use of terephthalic acid makes it possible to enhance the crystallinity of the resin, so that a composite hollow-fiber membrane excellent in mechanical properties and excellent in handleability can be obtained. The use of isophthalic acid makes it possible to prevent excessive crystallization, so that good permeation performance can be obtained. Using one kind of dicarboxylic acid or using two or more kinds in combination makes it possible to exert the effects of the present invention without any problems.

In the polyester resin, the bond formed by polymerization is an ester bond. In particular, since cleavage of the main chain hardly occurs even in the case of being in contact with an acid and an oxidant, the polyester resin has good resistance to an acid and an oxidant, and thus is preferred.

The weight average molecular weight (Mw) of the polyester resin having a glycol moiety and a dicarboxylic acid moiety is preferably 10,000 to 1,000,000. When the Mw of the polyester resin is 10,000 or more, thermal decomposition during melt spinning can be prevented, and the membrane strength of the composite hollow-fiber membrane can reach a practical level, and thus Mw of 10,000 or more is preferred. In addition, when the Mw of the polyester resin is 1,000,000 or less, the melt viscosity can be prevented from being too high and stable melt spinning can be performed, and thus Mw of 1,000,000 or less is preferred. The Mw of the polyester resin is more preferably 20,000 to 900,000, and still more preferably 30,000 to 800,000.

The resin composition (a) may contain only one type of thermoplastic resin, or may contain two or more types of thermoplastic resins.

The content of the thermoplastic resin in the resin composition (a) is preferably 70 wt % to 100 wt %, more preferably 80 wt % to 100 wt %, and particularly preferably 90 wt % to 100 wt %, when total weight of all components of the resin composition (a) is taken as 100 wt %.

In addition, the content of the thermoplastic resin during melting the resin composition (a) by heating is preferably 30 wt % to 70 wt % when the total of the components constituting the resin composition (a) before heating is taken as 100 wt %.

When the content is 30 wt % or more, the membrane strength of the composite hollow-fiber membrane is good. When the content is 70 wt % or less, the permeation performance of the composite hollow-fiber membrane is good. The content is more preferably 35 wt % to 65 wt %, and still more preferably 40 wt % to 60 wt %.

(1-2) Plasticizer

The resin composition (a) constituting the layer (A) of the composite hollow-fiber membrane according to the present invention may contain a plasticizer.

The plasticizer is not particularly limited as long as it is a compound which further thermoplasticizes the thermoplastic resin described in (1-1). The plasticizer can be used alone, or may be used in combination of two or more thereof.

Specific examples of the plasticizer include: polyalkylene glycol compounds such as polyethylene glycol and polyethylene glycol fatty acid ester; glycerin compounds such as glycerin fatty acid ester and diglycerin fatty acid ester; citric acid ester compounds; phosphoric acid ester compounds; fatty acid ester compounds such as adipic acid esters; caprolactone compounds; or derivatives thereof.

Among these, in a case where the thermoplastic resin is a cellulose ester or a polyimide resin, polyalkylene glycol compounds are preferred because of good compatibility from the view point that they exert a plasticizing effect with a small amount of addition to prevent a decrease in membrane strength.

Specific preferred examples of the polyalkylene glycol compounds include polyethylene glycol, polypropylene glycol, and polybutylene glycol which have a weight average molecular weight of 400 to 4,000. Polyethylene glycol is preferred.

In addition, the content of the plasticizer during melting the resin composition (a) by heating is preferably 5 wt % to 40 wt % When the total of the components constituting the resin composition (a) before heating is taken as 100 wt %.

When the content is 5 wt % or more, the additional thermoplasticity of the thermoplastic resin and the permeation performance of the composite hollow-fiber membrane are good. When the content is 40 wt % or less, the membrane strength of the composite hollow-fiber membrane is good. The content of the plasticizer is more preferably 10 wt % to 35 wt %, and still more preferably 15 wt % to 30 wt %.

The plasticizer may remain in the layer (A) or may be eluted from the layer (A) after the resin composition (a) is melted to form the layer (A) of the composite hollow-fiber membrane. In the case of the plasticizer being eluted, traces of plasticizer loss may become pores in the membrane, resulting in good permeation performance.

(1-3) Antioxidant

The resin composition (a) constituting the layer (A) of the composite hollow-fiber membrane according to the present invention preferably contains an antioxidant.

As specific examples of the antioxidant, it is preferable to contain a phosphorus-based antioxidant and a hindered phenolic antioxidant. The phosphorus-based antioxidant is more preferably a pentaerythritol-based compound. Specific examples of the pentaerythritol-based compound include bis(2,6-di-t-butyl-4-methylphenyl) pentaerythritol diphosphite. Specific examples of the hindered phenolic antioxidant include N,N-(hexane-1,6-diyl) bis[4-hydroxy-3,5-bis(t-butyl)benzenepropanamide].

Among these, the phosphorus-based antioxidant is preferred when the thermoplastic resin is a cellulose ester, and the hindered phenolic antioxidant is preferred when the thermoplastic resin is a polyamide resin.

In the case of the antioxidant being contained, the thermal decomposition during melting is prevented, and as a result, the membrane strength can be improved and the coloring of the membrane can be prevented.

The content of the antioxidant during melting the resin composition (a) by heating is preferably 0.005 wt % to 0.500 wt % when the total of the components constituting the resin composition (a) before heating is taken as 100 wt %.

(1-4) Structure-Forming Agent

The resin composition (a) constituting the layer (A) of the composite hollow-fiber membrane according to the present invention may contain a structure-forming agent.

The structure-forming agent in the present invention may be any thermoplastic resin that can be eluted or decomposed with a solvent after being mixed with the thermoplastic resin to form a membrane.

The structure-forming agent in the present invention is preferably soluble in water, or has a contact angle with respect to water smaller than that of the thermoplastic resin contained in the resin composition (a) from the viewpoint of easy elution.

Specific examples of the structure-forming agent include PVP-based copolymers such as polyalkylene glycol, polyvinylpyrrolidone (PVP), a PVP/vinyl acetate copolymer, a PVP/methyl methacrylate copolymer, polyvinyl alcohols, and polyester compounds. The structure-forming agent can be used alone or in combination.

The polyalkylene glycol is preferably polyethylene glycol, polypropylene glycol, polybutylene glycol or the like having a weight average molecular weight (Mw) of 4,000 to 100,000.

When thermal crosslinking occurs in PVP, it is difficult for the structure-forming agent to elute from the membrane. Thus, PVP having a weight average molecular weight of 20,000 or less is preferred from the viewpoint that intermolecular crosslinking is relatively hard to proceed and the structure-forming agent can be eluted even when crosslinking occurs. In addition, it is also preferable to use a copolymer based on the above PVP from the viewpoint of preventing thermal crosslinking.

The structure-forming agent is eluted after the formation of the membrane in the production steps of the composite hollow-fiber membrane to form pores, but a part of the structure-forming agent may remain in the membrane.

In addition, the content of the structure-forming agent during melting the resin composition (a) by heating is preferably 20 wt % to 70 wt % when the total of the components constituting the resin composition (a) before heating is taken as 100 wt %.

When the content is 20 wt % or more, the permeation performance of the membrane is good. When the content is 70 wt % or less, the membrane strength of the membrane is good. The content of the structure-forming agent is more preferably 25 wt % or more, and still more preferably 30 wt % or more. Further, the content of the structure-forming agent is more preferably 65 wt % or less, and still more preferably 60 wt % or less.

(1-5) Additive

The resin composition (a) constituting the layer (A) of the composite hollow-fiber membrane according to the present invention may contain an additive other than those described in (1-1) to (1-4) as long as the effects of the present invention are not impaired.

Specific examples of the additive include an organic lubricant, a crystal nucleating agent, organic particles, inorganic particles, a terminal blocking agent, a chain extender, a ultraviolet absorber, an infrared absorber, anti-coloring agent, a delustering agent, an antibacterial agent, an anti-electricity agent, a deodorant, a flame retardant, a weathering agent, an antistatic agent, an antioxidant, an ion-exchanging agent, an antifoaming agent, a color pigment, an optical brightener and a dye.

(2) Resin Composition (b) (Resin Composition Constituting Layer (B))

The layer (B) of the composite hollow-fiber membrane according to the present invention contains a resin composition (b). The resin composition (b) can contain the components shown in the following (2-1) to (2-5).

(2-1) Thermoplastic Resin

The resin composition (b) constituting the layer (B) of the composite hollow-fiber membrane preferably contains a thermoplastic resin of the same type as the resin composition (a) from the viewpoint of adhesion to the layer (A).

Specific examples of the thermoplastic resin which can be contained in the resin composition (b) are the same as those described in the above (1-1).

It is preferred that the layer (B) contains at least one compound selected from the group consisting of a cellulose ester, a polyamide resin and a polyester resin.

The resin composition (b) may contain only one type of thermoplastic resin, or may contain two or more types of thermoplastic resins.

The content of the thermoplastic resin in the resin composition (b) is preferably 70 wt % to 100 wt %, more preferably 80 wt % to 100 wt %, and particularly preferably 90 wt % to 100 wt %, when all components of the resin composition (b) are taken as 100 wt %.

In addition, the content of the thermoplastic resin during melting the resin composition (b) by heating is preferably 20 wt % to 60 wt % when the total of the components constituting the resin composition (b) before heating is taken as 100 wt %.

When the content is 20 wt % or more, the membrane strength of the composite hollow-fiber membrane is good. When the content is 60 wt % or less, the permeation performance of the composite hollow-fiber membrane is good. The content is more preferably 25 wt % to 55 wt %, and still more preferably 30 wt % to 50 wt %.

(2-2) Plasticizer

The resin composition (b) constituting the layer (B) of the composite hollow-fiber membrane may contain a plasticizer.

The plasticizer is not particularly limited as long as it is a compound which further thermoplasticizes the thermoplastic resin described in (2-1). The plasticizer can be used alone, or may be used in combination of two or more thereof.

Specific examples of the plasticizer are the same as those described in the above (1-2).

In addition, the content of the plasticizer during melting the resin composition (b) by heating is preferably 15 wt % to 50 wt % when the total of the components constituting the resin composition (b) before heating is taken as 100 wt %. When the content is 15 wt % or more, the additional thermoplasticity of the thermoplastic resin and the permeation performance of the composite hollow-fiber membrane are good. When the content is 50 wt % or less, the membrane strength of the composite hollow-fiber membrane is good. The content of the plasticizer is more preferably 15 wt % to 45 wt %, and still more preferably 15 wt % to 40 wt %.

The plasticizer may remain in the layer (B) or may be eluted from the layer (B) after the resin composition (b) is melted to form the layer (B) of the composite hollow-fiber membrane. In the case of the plasticizer being eluted, traces of plasticizer loss may become pores in the membrane, and the permeation performance becomes good.

(2-3) Antioxidant

The resin composition (b) constituting the layer (B) of the composite hollow-fiber membrane preferably contains an antioxidant.

Specific examples of the antioxidant are the same as those described in the above (1-3).

In the case of the antioxidant being contained, the thermal decomposition during melting by heating is prevented, and as a result, the membrane strength can be improved and the coloring of the membrane can be prevented.

The content of the antioxidant during melting the resin composition (b) by heating is preferably 0.005 wt % to 0.500 wt % When the total of the components constituting the resin composition (b) before heating is taken as 100 wt %.

(2-4) Structure-forming Agent

The resin composition (b) constituting the layer (B) of the composite hollow-fiber membrane may contain a structure-forming agent.

The structure-forming agent may be a thermoplastic resin which can be eluted or decomposed with a solvent after forming a membrane.

Specific examples of the structure-forming agent are the same as those described in the above (1-4).

The structure-forming agent is eluted after the formation of the membrane in the production steps of the composite hollow-fiber membrane to form pores, but a part of the structure-forming agent may remain in the membrane.

In addition, the content of the structure-forming agent during melting the resin composition (b) by heating is preferably 20 wt % to 80 wt % when the total of the components constituting the resin composition (b) before heating is taken as 100 wt %.

When the content is 20 wt % or more, the permeation performance of the membrane is good. When the content is 80 wt % or less, the membrane strength of the membrane is good. The content of the structure-forming agent is more preferably 25 wt % or more, and still more preferably 30 wt % or more. Further, the content of the structure-forming agent is more preferably 75 wt % or less, and still more preferably 70 wt % or less.

(2-5) Additive

The resin composition (b) constituting the layer (B) of the composite hollow-fiber membrane may contain an additive other than those described in (2-1) to (2-4) as long as the effects of the present invention are not impaired.

Specific examples of the additive are the same as those described in the above (1-5).

(3) Layer Constitution of Membrane

The composite hollow-fiber membrane according to the present invention has at least two resin layers.

One of the two resin layers is the above layer (A), and the other is the above layer (B).

The composite hollow-fiber membrane may be composed of two layers of the layer (A) and the layer (B), and may be composed of three or more layers including another layer, as long as the composite hollow-fiber membrane includes at least the above two layers. The layer having a co-continuous structure, which will be described later, and having the lowest porosity is referred to as layer (A), and the other layer having the highest porosity is referred to as layer (B).

In a case where the composite hollow-fiber membrane is constituted by two layers, the layer (A) and the layer (B), either may be the outer layer, but it is preferable that the layer (A) is the outer layer.

In a case where the composite hollow-fiber membrane is constituted by three or more layers, the lamination order is not particularly limited, but it is preferable that the layer (A) is the outermost layer.

In a case where the hollow-fiber membrane has a plurality of layers having the same composition as one another and having different opening ratios, each of these layers is recognized as a separate layer, so that the hollow-fiber membrane falls within the constitution "having a layer (A) and a layer (B)".

(4) Cross Sectional Structure of Membrane (4-1) Cross Sectional Structure of Layer (A)

The layer (A) of the composite hollow-fiber membrane according to the present invention has a co-continuous structure including a phase containing a thermoplastic resin and voids, and it is important that the structure period ($D_A$) of the layer (A) is 1 nm to 1000 nm in the co-continuous structure.

Herein, the co-continuous structure refers to a state where the phase containing a thermoplastic resin and the voids are respectively continuous and three-dimensionally intertwined with each other, for example, when a hollow-fiber membrane is sufficiently cooled in liquid nitrogen, a stress is applied to cleave the membrane to expose a cross section in the thickness direction of the membrane, and the cross section is observed by a scanning electron microscope (SEM) (see FIG. 1).

A schematic diagram of the co-continuous structure is also described in, for example, "Polymer Alloy Foundation and Application (2nd Edition) (Chapter 10.1)" edited by the Society of Polymer Science: Tokyo Kagaku Dojin.

The structure period refers to the period calculated in the following manner: an image obtained by observation with a transmission electron microscope or scanning electron microscope is Fourier transformed and the wavenumber is plotted on the horizontal axis and the intensity is plotted on the vertical axis in a graph. The peak is calculated from the wavenumber of the maximum peak of the graph. The method of measuring the structure period is described in Examples.

When the $D_A$ is less than 1 nm, the permeation performance is insufficient, and when the $D_A$ is more than 1000 nm, the membrane strength is insufficient.

From the viewpoint of achieving both the permeation performance and the membrane strength, the structure period ($D_A$) of the layer (A) is preferably 5 nm or more, more preferably 10 nm or more, still more preferably 15 nm or more, and particularly preferably 20 nm or more. Similarly, $D_A$ is preferably 500 nm or less, more preferably 300 nm or less, still more preferably 200 nm or less, and particularly preferably 100 nm or less.

The method for forming a co-continuous structure in which the structure period falls within the above range is not particularly limited, and it is possible to adopt, in the production of the hollow-fiber membrane, a step of melt-kneading the thermoplastic resin, the plasticizer and the structure-forming agent at the above preferred contents, and a step of inducing phase separation of the thermoplastic resin and the structure-forming agent by heat treatment under preferred conditions, which will be described later.

In general, a porous body having a co-continuous structure has higher uniformity in pore diameter than a porous body composed of an assembly of particles. Here the pore diameter refers to the above structure period.

The uniformity of the pore diameter can be determined by the peak half width of a curve with the pore diameter plotted on the horizontal axis and the number of pores having the corresponding pore diameter plotted on the vertical axis. That is, in the case of a membrane having uniform pore diameter, the curve forms a sharp peak and the half width becomes narrower. On the other hand, in the case of having a non-uniform pore diameter, the curve forms a broad peak and the half width becomes wider. Since the evaluation of the pore diameter uniformity by the peak half width of the graph plotting the pore diameter on the horizontal axis and the number of pores on the vertical axis can be the same as an evaluation in which a reciprocal of the pore diameter, namely the wavenumber, is plotted on the horizontal axis, the evaluation is made by using a graph obtained by Fourier-transformation of the above described electron microscope image.

The microscope image is photographed in a square visual field with each side having a length 10 times to 100 times the structure period of the co-continuous structure. The peak half width and the peak maximum wavenumber of the graph, in which the wavenumber is plotted on the horizontal axis of the Fourier transformed graph and the intensity is plotted on the vertical axis, are determined.

Since the peak half width tends to increase as the peak maximum wavenumber increases, the value of (a)/(b) calculated from the peak half width (a) and the peak maximum wavenumber (b) is used as an index of the pore diameter uniformity evaluation.

In order to exhibit an excellent separation property, a higher pore diameter uniformity is preferred, and the value of (a)/(b) is preferably 1.5 or less, more preferably 1.2 or less, and still more preferably 1.0 or less. Since higher uniformity in the pore structure is preferable, from the viewpoint of separation performance, (a)/(b) is a value larger than 0, although a lower limit value thereof is not particularly limited.

In a graph with horizontal axis for wavenumber and vertical axis for intensity, which is obtained by Fourier transformation of a microscopic image photographed in a square visual field with each side having a length 10 times to 100 times the structure period of the co-continuous structure of the layer (A), when a peak half width is set as (a) and a peak maximum wavenumber is set as (b) in the graph, it is preferable that a region of 0<(a)/(b)≤1.5 is included therein.

(4-2) Cross Sectional Structure of Layer (B)

The cross sectional structure of the layer (B) of the composite hollow-fiber membrane according to the present invention is not particularly limited, and it is preferable to have a spherical structure or a three-dimensional network structure from the viewpoint of improving the permeation performance and the membrane strength. Here, the "spherical structure" refers to a structure in which a large number of spherical or substantially spherical solid components are directly or linearly connected via the solid components. Here, the "three-dimensional network structure" refers to a structure in which solid components extend in a three-dimensional network. In the present application, in a case where the maximum peak is obtained when the calculation of the structure period is attempted by the same method as (4-1), it is regarded as a co-continuous structure.

The spherical structure or the three-dimensional network structure can be observed, for example, by applying stress to a hollow-fiber membrane sufficiently cooled in liquid nitrogen and observing a cross section cut in the thickness direction of the membrane by a scanning electron microscope (SEM).

The structure period ($D_{B1}$) of the layer (B) can be determined by the same method as $D_A$ described in (4-1) and in a case where the maximum peak is not obtained, the pore diameter ($D_{B2}$) of the layer (B) is determined instead of the structure period.

From the viewpoint of achieving both the permeation performance and the membrane strength, $D_{B1}$ is preferably 300 nm or more, more preferably 400 nm or more, and still more preferably 500 inn or more. Similarly, $D_{B1}$ is preferably 2,000 nm or less, more preferably 1,500 nm or less, and still more preferably 1,200 nm or less. The method of measuring $D_{B1}$ is described in Examples.

From the viewpoint of achieving both the permeation performance and the membrane strength, $D_{B2}$ is preferably 300 nm or more, more preferably 400 nm or more, and still more preferably 500 nm or more. Similarly, $D_{B2}$ is preferably 2,000 nm or less, more preferably 1,500 nm or less, and still more preferably 1,200 nm or less. The method of measuring $D_{B2}$ is described in Examples.

(4-3) Layer Structure of Composite Hollow-Fiber Membrane

In the composite hollow-fiber membrane according to the present invention, it is preferable that the above $D_A$ and the above $D_{B1}$ satisfy $D_A<D_{B1}$ from the viewpoint of obtaining good permeation performance. $3.0D_A<D_{B1}$ is preferred, $5.0D_A<D_{B1}$ is more preferred, and $15D_A<D_{B1}$ is still more preferred. That is, $D_{B1}/D_A$ is preferably more than 1, more preferably more than 3.0, still more preferably more than 5.0, and most preferably more than 15.0.

It is preferable that the above $D_A$ and the above $D_{B2}$ satisfy $D_A<D_B$ from the viewpoint of obtaining good permeation performance. $3.0D_A<D_{B2}$ is preferred, $5.0D_A<D_{B2}$ is more preferred, and $15D_A<D_{B2}$ is still more preferred. That is, $D_{B2}/D_A$ is preferably more than 1, more preferably more than 3.0, still more preferably more than 5.0, and most preferably more than 15.0.

(5) Cross Sectional Shape of Membrane

An outer diameter of the composite hollow-fiber membrane according to the present invention is preferably 50 μm to 2500 μm from the viewpoint of achieving both the effective membrane area and the membrane strength at a time of being filled in the module. The outer diameter is more preferably 100 μm or more, still more preferably 200 μm or more, and particularly preferably 300 μm or more. In addition, the outer diameter is more preferably 2,000 μm or less, still more preferably 1,500 μm or less, and particularly preferably 1,000 μm or less.

In addition, in view of a relationship between a pressure loss of a fluid flowing through a hollow part and a buckling pressure, the percentage of hollowness of the hollow-fiber is preferably 15% to 70%, more preferably 20% to 65%, and still more preferably 25% to 60%.

From the viewpoint of achieving both the permeation performance and the membrane strength, thickness of the composite hollow-fiber membrane according to the present invention is preferably 10 μm to 500 μm. The thickness is more preferably 20 μm or more, still more preferably 30 μm or more, and particularly preferably 40 μm or more. The thickness is more preferably 400 μm or less, still more preferably 300 μm or less, and particularly preferably 200 μm or less.

In the composite hollow-fiber membrane according to the present invention, the thickness of the layer (A) in the thickness of the composite hollow-fiber membrane is preferably 1 μm to 50 μm. When the thickness of the layer (A) is less than 1 μm, the separation performance is degraded, and when the thickness is more than 50 μm, the permeation performance is degraded, The thickness of the layer (A) is more preferably 2 μm or more, still more preferably 3 μm or more, even more preferably 4 μm or more, and particularly preferably 5 μm or more. In addition, the thickness of the layer (A) is more preferably 40 μm or less, still more preferably 30 μm or less, even more preferably 20 μm or less, and particularly preferably 10 μm or less.

The thickness of the layer (B) is preferably 9 μm or more, more preferably 18 μm or more, still more preferably 27 μm or more, and particularly preferably 36 μm or more. In addition, the thickness of the layer (B) is preferably 450 μm or less, more preferably 360 μm or less, still more preferably 270 μm or less, and particularly preferably 180 μm or less.

The method for adjusting the outer diameter, the percentage of hollowness, or the thickness of the composite hollow-fiber membrane to fall within the above-mentioned range is not particularly limited. For example, the adjustment can be made by changing a shape of a discharge outlet of a spinning spinneret for producing the composite hollow-fiber membrane, changing a draft ratio, etc.

In addition, the method for adjusting the thickness ratio of layer (A) to layer (B) is not particularly limited either. For example, the adjustment can be made by changing a shape of a flow channel clearance of the resin composition constituting each layer in the spinning spinneret for producing the composite hollow-fiber membrane, changing a discharge amount from an extruder of the resin composition constituting each layer with a gear pump, etc.

(6) Opening Ratio

In the composite hollow-fiber membrane according to the present invention, an opening ratio $H_A$ of the layer (A) and an opening ratio $H_B$ of the layer (B) satisfy $H_A<H_B$.

When the above relational expression is not satisfied, it is not possible to achieve both the permeation performance and the membrane strength. $1.5H_A<H_B$ is preferred, and $3.0H_A<H_B$ is more preferred. That is, $H_B/H_A$ is more than 1, preferably more than 1.5, and more preferably more than 3.0.

Measurement conditions for the opening ratio will be described in detail in Examples.

The opening ratio $H_A$ of the layer (A) is preferably 10% to 70%. When the opening ratio $H_A$ is 10% or more, a good permeation flux can be obtained, and when the opening ratio $H_A$ is 70% or less, a good membrane strength can be obtained. The opening ratio $H_A$ of the layer (A) is more preferably 15% or more, still more preferably 20% or more, and particularly preferably 25% or more. In addition, the opening ratio $H_A$ of the layer (A) is more preferably 65% or less, still more preferably 60% or less, and particularly preferably 55% or less.

The opening ratio $H_B$ of the layer (B) is preferably 30% to 80%. When the opening ratio $H_B$ is 30% or more, a good permeation flux can be obtained, and when the opening ratio $H_B$ is 80% or less, a good membrane strength can be obtained. The opening ratio $H_B$ of the layer (B) is more preferably 35% or more, still more preferably 40% or more, and particularly preferably 45% or more. The opening ratio $H_B$ of the layer (B) is more preferably 75% or less, still more preferably 70% or less, and particularly preferably 65% or less.

The method for adjusting the opening ratio of layer (A) and layer (B) is not particularly limited. Examples include a method of spinning using a resin composition containing a thermoplastic resin plasticizer and/or a structure-forming agent of the preferred type and amount described above, inducing phase separation of the thermoplastic resin and the structure-forming agent by heat treatment under preferred conditions, which will be described later, and then eluting the plasticizer and/or the structure-forming agent from each layer of the composite hollow-fiber membrane to form pores.

(Membrane Permeation Flux)

The composite hollow-fiber membrane according to the present invention preferably has a membrane permeation flux of 0.1 $m^3/m^2$/hr to 10 $m^3/m^2$/hr at 50 kPa and 25° C. The membrane permeation flux is more preferably 0.3 $m^3/m^2$/hr or more, and still more preferably 0.5 m3/m2 hr or more. Measurement conditions for the membrane permeation flux will be described in detail in Examples.

(Membrane Strength)

The composite hollow-fiber membrane according to the present invention preferably has a tensile strength of 10 MPa or more in a lengthwise direction, in order to exert membrane strength against the tension in the lengthwise direction. Measurement conditions for the tensile strength will be described in detail in Examples. The tensile strength is more preferably 15 MPa or more, and still more preferably 20 MPa or more. Higher tensile strength is preferable, but is preferably 300 MPa or less from the viewpoint of balance with elongation.

(Production Method)

Next, the method for producing the composite hollow-fiber membrane according to the present invention will be specifically described, but it is not limited thereto.

The method for producing a composite hollow-fiber membrane having two or more layers according to the present invention includes the following steps 1 to 5:

1. a melting step by heating a resin composition constituting each layer of the composite hollow-fiber membrane, in which the resin composition constituting at least one layer contains a thermoplastic resin and a structure-forming agent;

2. a compositing step by running the melted resin compositions of the respective layers together in a spinneret having a multiple annular nozzle in which a gas flow channel is disposed at a central portion;

3. a molding step by discharging the composited resin composition from the multiple annular nozzle into air to obtain a hollow-fiber molded product;

4. a co-continuous structure forming step by performing phase separation to form a co-continuous structure, which includes a first phase containing a thermoplastic resin and a second phase containing a structure-forming agent in the layer constituted by the resin composition containing the thermoplastic resin and the structure-forming agent in the hollow-fiber molded product; and 5. an eluting step of eluting the structure-forming agent.

In order to obtain the resin composition constituting each layer of the composite hollow-fiber membrane according to the present invention, a method of melting and kneading each component is used. The device to be used is not particularly limited, and known mixers such as a kneader, a roll mill, a Banbury mixer, a single screw or a twin-screw extruder can be used. Among these, the use of a twin-screw extruder is preferred from the viewpoint of improving the dispensability of the plasticizer and the structure-forming agent. The use of a vented twin-screw extruder is more preferred from the viewpoint of being able to remove volatiles such as water and low molecular weight substances.

The obtained resin composition may be pelletized temporarily, melted again and used for melt spinning, or may be directly led to the spinning spinneret and used for melt spinning. When the resin composition is temporarily pelletized, it is preferable that the pellet is dried to make the resin composition have a water content of 500 ppm (by weight) or less for use.

The melted resin compositions of the respective layers obtained in the above method is composited by running them together in a spinning spinneret having a multiple annular nozzle in which a gas flow channel is disposed at a central portion. At this time, the shape of the flow channel clearance of the resin composition constituting each layer in the spinning spinneret is appropriately changed according to the melt viscosity of the resin composition and the desired cross sectional shape of the composite hollow-fiber membrane to be produced. In addition, the discharge amount of the resin composition constituting each layer of the composite hollow-fiber membrane from the spinneret is appropriately changed according to the desired cross sectional shape of the composite hollow-fiber membrane to be produced, for example, by the number of rotations of a gear pump.

Then, the composited resin composition is discharged into air from the spinning spinneret having a multiple annular nozzle. Here, a distance L from a lower surface of the spinning spinneret to an upper end of a cooling apparatus (chimney) is preferably 0 mm to 50 mm. In addition, when the hollow-fiber membrane discharged from the spinning spinneret is cooled, a temperature of the cooling air of the cooling apparatus (chimney) is preferably 5° C. to 25° C. In addition, an air speed of the cooling air is preferably 0.8 m/sec to 2.0 m/sec.

The hollow-fiber membrane cooled with the cooling apparatus is wound by a winder. The draft ratio which can be calculated by a winding rate/discharge rate is preferably 50 to 500.

The composite hollow-fiber membrane spun by the above method may be further subjected to a stretching step. For stretching, the membrane may be wound first then unwind to use in stretching, or may be directly led to a stretching step to be stretched. It is preferable to go through the stretching step from the viewpoint of improving the membrane strength by achieving a high orientation of the thermoplastic resin. The stretching method is not particularly limited. For example, use may be made of a method in which the hollow-fiber membrane before being stretched is conveyed on a heating roll to raise its temperature to the temperature at which stretching is performed, and the membrane is stretched using a peripheral speed difference between the rolls, or a method in which the hollow-fiber membrane is conveyed through a dry heat oven or a heating liquid such as hot water or a solvent to raise its temperature to the temperature at Which stretching is performed or, and the membrane is stretched using a peripheral speed difference between rolls. In addition, stretching may be performed in one stage, or may be performed in two or more stages.

The preferred range of the temperature of the composite hollow-fiber membrane in the stretching step is 40° C. to 180° C., more preferably 60° C. to 160° C., and still more preferably 80° C. to 140° C. A total stretching ratio is preferably 1.2 times or more, more preferably 1.4 times or more, and still more preferably 1.6 times or more. In addition, the total stretching ratio is preferably 5.0 times or less, more preferably 4.5 times or less, and still more preferably 4.0 times or less.

The composite hollow-fiber membrane spun by the above method may be further subjected to a heat treatment step. It is preferable to perform the heat treatment step from the viewpoint of being capable of promoting the phase separation between the thermoplastic resin and the structure-forming agent and developing the co-continuous structure. The heat treatment method is not particularly limited, and may be a method of conveying the membrane on a heating roll, a method of conveying the membrane in a heating medium such as an oven, or a method of charging the membrane into an oven in the state of a roll wound on a bobbin or a paper tube.

The heat treatment temperature is preferably 80° C. or higher, more preferably 100° C. or higher, and still more preferably 120° C. or higher. In addition, the heat treatment temperature is preferably 250° C. or lower, more preferably 200° C. or lower, still more preferably 180° C. or lower, and particularly preferably 160° C. or lower.

The heat treatment time is preferably 10 seconds or longer, more preferably 20 seconds or longer, and still more preferably 30 seconds or longer. In addition, the heat treatment time is preferably 600 seconds or shorter, more preferably 480 seconds or shorter, and still more preferably 360 seconds or shorter.

It is preferable to set a relaxation rate in the lengthwise direction during the heat treatment to 1% to 20% from the viewpoint of balancing the orientation of the thermoplastic resin by heat treatment and the formation of a co-continuous structure with the progress of phase separation, and achieving both the membrane strength and the permeation performance.

Here, the relaxation rate is described by Formula (I).

$$\text{Relaxation Rate} = (\text{Lengthwise Length before Heat Treatment} - \text{Lengthwise Length after Heat Treatment})/\text{Lengthwise Length after Heat Treatment} \times 100 \quad \text{Formula (I)}$$

The relaxation in the lengthwise direction is preferably 3% or more, and more preferably 5% or more. In addition, the relaxation in the lengthwise direction is preferably 17% or less, and more preferably 15% or less.

Subsequently, a step of eluting the plasticizer and the structure-forming agent is performed by immersing the membrane in a solvent such as water, an aqueous alcohol solution, an acidic aqueous solution, or an alkaline aqueous solution. Thereafter, a composite hollow-fiber membrane is obtained.

The composite hollow-fiber membrane thus obtained can be used as it is, but it is preferable to hydrophilize the surface of the membrane with, for example, an aqueous alcohol solution or an alkaline aqueous solution before use.

Thus, the composite hollow-fiber membrane according to the present invention can be produced.

(Module)

The composite hollow-fiber membrane according to the present invention may be incorporated into a hollow-fiber membrane module when used. The hollow-fiber membrane module includes, for example, a membrane bundle constituted of a plurality of hollow-fiber membranes and a case accommodating this membrane bundle therein.

EXAMPLES

The present invention is more specifically described below by showing Examples. However, the present invention should not be construed as being restricted thereby in any way.

[Measurement and Evaluation Method]

Hereinafter, the present invention will be described in more detail with reference to Examples. Respective characteristic value in examples is obtained by the following method.

The present invention is not limited to Examples.

(1) Average Degree of Substitution for Cellulose-Mixed Ester

A method for calculating the average degree of substitution for a cellulose-mixed ester in which acetyl groups and acyl groups are bonded to cellulose is as follows.

A cellulose-mixed ester was dried at 80° C. for 8 hours, weighed for 0.9 g, and dissolved by adding 35 mL of acetone and 1.5 mL of dimethyl sulfoxide. Subsequently, 50 mL of acetone was further added thereto. 30 mL of a 0.5 N aqueous solution of sodium hydroxide was added while stirring, followed by saponification for 2 hours. Then, 50 mL of hot water was added to wash a side surface of a flask. Thereafter, titration was performed with 0.5 N sulfuric acid using phenolphthalein as an indicator. Separately, a blank test was performed by the same method as for the sample. After the completion of the titration, a supernatant of the solution was diluted to 100 times, and the compositions of organic acids were determined using an ion chromatograph. From the measurement result and the results of acid composition analysis by the ion chromatograph, the degrees of substitution were calculated by the following formulae.

$$TA=(B-A)\times F/(1000\times W)$$

$$DSace=(162.14\times TA)/[\{1-Mwace-(16.00+1.01))\times TA\}+\{1-(Mwacy-(16.00+1.01))\times TA\}\times (Acy/Ace)]$$

$$DSacy=DSace\times (Acy/Ace)$$

TA: Total organic acid amount (mL)
A: Sample titration amount (mL)
B: Blank test titration amount (mL)
F: Titer of sulfuric acid
W: Sample weight (g)
DSace: Average degree of substitution of acetyl groups
DSacy: Average degree of substitution of acyl groups
Mwace: Molecular weight of acetic acid.
Mwacy: Molecular weight of other organic acids
Acy/Ace: Molar ratio of acetic acid (Ace) and other organic acids (Acy)
162.14: Molecular weight of a repeating unit of cellulose
16.00: Atomic weight of oxygen
1.01: Atomic weight of hydrogen (2) Weight Average Molecular Weight (Mw) of Thermoplastic Resin A thermoplastic resin was completely dissolved in tetrahydrofuran or N-methyl pyrrolidone (hereinafter sometimes referred to as NMP) to a concentration of 0.15 wt % to prepare a sample for GPC measurement. Using this sample, GPC measurement was performed with Waters 2690 under the following conditions to determine the weight average molecular weight (Mw) in terms of polystyrene conversion.

Column: Two TSK gel GMHHR-H columns (manufactured by Tosoh Corporation) were connected to each other.
Detector: Waters 2410, differential refractometer RI
Solvent for mobile phase: NMP or Tetrahydrofuran
Flow rate: 1.0 mL/min
Injection amount: 200 µL (3) Structure Period ($D_A$ and $D_{B1}$)

As described below, the cross section of the membrane was observed and calculated with a transmission electron microscope (TEM) or a scanning electron microscope (SEM).

Pre-treatment (TEM): Ultra-thin sections were cut in out a direction perpendicular to the lengthwise direction of the composite hollow-fiber membrane.

Pre-treatment (SEM): A composite hollow-fiber membrane was frozen in liquid nitrogen, then a stress was applied to cleave the membrane so as to expose a cross section in a direction perpendicular to a lengthwise direction of the composite hollow-fiber membrane, and sputtering was performed with platinum.

Observation: The cross section of the layer (A) portion in the direction perpendicular to the lengthwise direction of the composite hollow-fiber membrane was observed using a TEM or a SEM at a magnification of 10,000 to 100,000, and an image of one visual field was obtained. At this time, the observation magnification was adjusted so as to obtain a square visual field with each side having a length 10 times to 100 times the pore diameter or the width of the void.

When the void had a width which was too small to observe by SEM, observation was carried out by TEM. A square image was cut out from the obtained image and Fourier transformed, and then a graph was plotted with wavenumber on a horizontal axis and intensity on a vertical axis. A period λ (=1/q) was calculated from the wavenumber q of a maximum peak and this period was taken as the structure period of the visual field. When the maximum peak was not obtained, the observation magnification was suitably adjusted within a range where each side of the square visual field had a length 10 times to 100 times the pore diameter or the width of the void and the cross section was observed again to calculate the structure period. When the obtained structure period and one side of the square image did not satisfy the relationship of Formula (II), the size of the square was changed and adjusted so as to satisfy the relationship of Formula (II), thereby calculating the structure period. An observation position includes the vicinity of both ends of the layer (A) in the thickness direction, and 10 positions at equal intervals in a membrane thickness direction were taken, and the structure period $D_A$ was calculated at each observation position. A numerical value of the observation position where the structure period was the smallest among them was taken as the structure period. Similarly, the structure period $D_{B1}$ was calculated for the layer (B).

Structure Period×10≤Side of Square≤Structure Period×100  Formula (II)

(4) (a)/(b)

(a)/(b) as an index for the uniformity of the structure period was determined from the peak half width (a) and the peak maximum wavenumber (b) in the graph with wavenumber plotted on the horizontal axis and intensity plotted on a vertical axis obtained in (3). The graph used was a graph of the observation point with the smallest numerical value adopted as the structure period in (3). Regarding (a)/(b) in Table 1 and Table 2, those described as "–" indicate that the maximum peak was not obtained.

(5) Pore Diameter ($D_{B2}$)

In the layer (B), when the maximum peak was not obtained by the method of (3), the pore diameter was determined by the following method. Regarding the pore diameter, the layer (B) was photographed at a magnification of 10000 using a scanning electron microscope in the radial cross section of the composite hollow-fiber membrane. The observation position includes the vicinity of both ends of the layer (B) in the thickness direction, and 10 positions at equal intervals in the membrane thickness direction were taken, so as to perform observation. In the images thus obtained, the diameter of 50 pores was measured for each image, and the number average was taken as the pore diameter $D_{B2}$.

(6) Thickness (μm) of Composite Hollow-Fiber Membrane, Thickness (μm) of Layer (A), and Thickness (μm) of Layer (B)

The cross section of the membrane prepared in the above (3) was observed by SEM and photographed to calculate the thickness of the composite hollow-fiber membrane, the thickness of the layer (A), and the thickness (μm) of the layer (B). Each thickness was calculated by observing 10 arbitrary positions and taking the average value.

(7) Outer Diameter (μm) of Composite Hollow-Fiber Membrane

The cross section of the membrane prepared in the above (3) was observed by an optical microscope and photographed to calculate the outer diameter (μm) of the composite hollow-fiber membrane. The outer diameter of the composite hollow-fiber membrane was calculated by observing 10 arbitrary positions and taking the average value.

(8) Opening Ratio $H_A$ (%) and $H_B$ (%)

Using the membrane cross section prepared in the above (3), similar to (3), square images adjusted to satisfy the relationship of Formula (II) were taken at any five positions on central portions of the layer (A) and the layer (B) in the thickness direction. A transparent film or sheet was overlaid on the obtained image, and the portion corresponding to the void was filled with oil ink or the like. Subsequently, the proportion of the region corresponding to the void was determined using an image analyzer. The measurement was performed at five positions photographed for the layer (A) and the layer (B) respectively, and the opening ratio $H_A$ (%) and $H_B$ (%) of the layer were determined by averaging.

(9) Tensile Strength (MPa)

The tensile strength in the lengthwise direction of the composite hollow-fiber membrane vacuum-dried at 25° C. for 8 hours was measured using a tensile tester (Tensilon UCT-100 manufactured by Orientec Co., Ltd.) under an environment of a temperature of 20° C. and a humidity of 65%. Specifically, measurement was performed under conditions of a sample length of 100 mm and a tensile speed of 100 mm/min, and a tensile strength (breaking strength) (MPa) was calculated from the tensile strength. The number of measurements was 5 times, and the average value was taken.

(10) Permeation Performance (Membrane Permeation Flux (m³/m²/h))

Distilled water was sent over 30 minutes under conditions of a temperature of 25° C. and a filtration differential pressure of 50 kPa, and the amount (m³) of permeated water obtained was measured and converted into values per unit time (h) and per unit membrane area (m²), and the obtained value was taken as the permeation performance of pure water (unit=m³/m²/h). A small module having an effective length of 200 mm including 1 to 4 hollow-fiber membranes was prepared for the evaluation.

(11) Determination of Structure

The cross section of the membrane prepared in the above (3) was observed by SEM or TEM, and the structures of layer (A) and layer (B) were determined.

[Thermoplastic Resin]

Cellulose Ester (C1):

To 100 parts by weight of cellulose (cotton linter), 240 parts by weight of acetic acid and 67 parts by weight of propionic acid were added, followed by mixing at 50° C. for 30 minutes. After the mixture was cooled to room temperature, 172 parts by weight of acetic anhydride cooled in an ice bath and 168 parts by weight of propionic anhydride were added as esterifying agents, and 4 parts by weight of sulfuric acid was added as an esterifying catalyst, followed by stirring for 150 minutes to carry out an esterification reaction. When the temperature exceeded 40° C. in the esterification reaction, cooling was carried out in a water bath.

After the reaction, a mixed solution of 100 parts by weight of acetic acid and 33 parts by weight of water was added thereto as a reaction terminator for 20 minutes to hydrolyze excessive anhydrides. Thereafter, 333 parts by weight of acetic acid and 100 parts by weight of water were added, followed by heating and stirring at 80° C. for 1 hour. After the completion of the reaction, an aqueous solution containing 6 parts by weight of sodium carbonate was added. Cellulose acetate propionate precipitated was separated by filtration, subsequently washed with water, and thereafter dried at 60° C. for 4 hours. The average degrees of substitution of acetyl groups and propionyl groups of the cellulose acetate propionate obtained (cellulose ester (C1)) were 1.9 and 0.7, respectively, and the weight average molecular weight (Mw) thereof was 178,000.

Cellulose Ester (C2):

Cellulose acetate propionate (average degree of substitution of acetyl groups: 0.2, average degree of substitution of propionyl groups: 2.5, weight average molecular weight: 185,000)

Cellulose Ester (C3):

Cellulose acetate butyrate (average degree of substitution of acetyl groups: 0.9, average degree of substitution of butyronyl groups: 1.7, weight average molecular weight: 167,000)

Polyamide (A1):

Nylon 66 (nylon 66 resin "Amilan" manufactured by Toray Industries, Inc.

Polyamide (A2):

Nylon 6 (nylon 6 resin "Amilan" manufactured by Toray Industries, Inc.)

[Plasticizer (P)]

Plasticizer (P1):

Polyethylene glycol, weight average molecular weight: 600

[Structure-Forming Agent (S)]

Structure-Forming Agent (S1):

PVP/vinyl acetate copolymer (Kollidon VA64 (BASF Japan Ltd.))

Structure-Forming Agent (S2):

Polyvinyl pyrrolidone (PVP K17)

[Antioxidant (O)]

Antioxidant (O1):

Bis(2,6-di-t-butyl-4-methylphenyl) pentaerythritol diphosphite

Antioxidant (O2):

Hindered phenolic antioxidant (Irganox 1098 (registered trademark, manufactured BASF Co., Ltd.,))

[Production of Composite Hollow-Fiber Membrane]

Example 1

45 wt % of the cellulose ester (C1), 24.9 wt % of the plasticizer (P1), 30 wt % of the structure-forming agent (S1), and 0.1 wt % of the antioxidant (O1) were melt-kneaded at 240° C. with a twin-screw extruder, homogenized and then pelletized, to obtain a resin composition (a) for a layer (A). The pellets were vacuum-dried at 80° C. for 8 hours.

In addition, 45 wt % of the cellulose ester (C2), 14.9 wt % of the plasticizer (P1), 40 wt % of the structure-forming agent (S1), and 0.1 wt % of the antioxidant (O1) were melt-kneaded at 220° C. with a twin-screw extruder, homogenized and then pelletized, to obtain a resin composition (b) for a layer (B). The pellets were vacuum-dried at 80° C. for 8 hours.

The pellets of the resin composition (a) for the layer (A) and the pellets of the resin composition (b) for the layer (B) were supplied to separate twin-screw extruders and melt-kneaded at 220° C., and then an extrusion rate of the resin composition (a) was adjusted to 2.4 g/min and an extrusion rate of the resin composition (b) was adjusted to 24 g/min using a gear pump. Then, the resin compositions were introduced into a spinning spinneret pack having a multiple annular nozzle having a gas flow channel at the center such that the outer layer was the layer (A) and the inner layer was the layer (B), to be composited in the spinneret. The temperature of the spinning spinneret pack was 200° C., the discharge hole diameter was 8.3 mm, the slit width was 1.1 mm, and the number of holes was 1.

The spun hollow-fiber membranes were introduced to a cooling apparatus (chimney) such that a distance L from the lower surface of the spinneret to the upper end of the cooling apparatus was 30 mm, were cooled with cooling air at 25° C. and an air speed of 1.5 msec, and were wound by a winder such that the draft ratio was 60.

The spun yarn was subjected to heat treatment at 150° C. for 300 seconds while being subjected to 10% relaxation in the lengthwise direction, and then the composite hollow-fiber membrane was immersed in a 50% aqueous ethanol solution for 12 hours to elute the plasticizer and the structure-forming agent. The structure and physical properties of the obtained composite hollow-fiber membrane were shown in Table 1.

Example 2

A composite hollow-fiber membrane was obtained in the same manner as Example 1 except that the composition of the resin composition (a) for the layer (A) was changed to 60 wt % of the cellulose ester (C 1), 19.9 wt % of the plasticizer (P1), 20 wt % of the structure-forming agent (S1), and 0.1 wt % of the antioxidant (O1), and the heat treatment time was changed to 180 seconds. The structure and physical properties of the obtained composite hollow-fiber membrane were shown in Table 1.

Example 3

A composite hollow-fiber membrane was obtained in the same manner as Example 1 except that the composition of the resin composition (a) for the layer (A) was changed to 50 wt % of the cellulose ester (C1), 24.9 wt % of the plasticizer (P1), 25 wt % of the structure-forming agent (S1), and 0.1 wt % of the antioxidant (O1). The structure and physical properties of the obtained composite hollow-fiber membrane were shown in Table 1.

Example 4

A composite hollow-fiber membrane was obtained in the same manner as Example 1 except that the composition of the resin composition (a) for the layer (A) was changed to 35 wt % of the cellulose ester (C 1), 15.9 1% of the plasticizer (P1), 49 wt % of the structure-forming agent (S1), and 0.1 wt % of the antioxidant (O1), and the composition of the resin composition (b) for the layer (B) was changed to 35 wt % of the cellulose ester (C3), 15.9 wt % of the plasticizer (P1), 49 wt % of the structure-forming agent (S1), and 0.1 wt % of the antioxidant (O1). The structure and physical properties of the obtained composite hollow-fiber membrane were shown in Table 1.

Example 5

A composite hollow-fiber membrane was obtained in the same manner as Example 1 except that the composition of the resin composition (a) for the layer (A) was changed to 30 wt % of the cellulose ester (C1), 5.9 wt % of the plasticizer (P1), 64 wt % of the structure-forming agent (S1), and 0.1 wt % of the antioxidant (O1), the composition of the resin composition (b) for the layer (B) was changed to 35 wt % of the cellulose ester (C3), 1.59 wt % of the plasticizer (P1), 49 wt % of the structure-forming agent (S1), and 0.1 wt % of the antioxidant (O1), and the heat treatment time was changed to 600 seconds. The structure and physical properties of the obtained composite hollow-fiber membrane were shown in Table 1.

Example 6

A composite hollow-fiber membrane was obtained in the same manner as Example 1 except that the composition of the resin composition (a) for the layer (A) was changed to 30 wt % of the cellulose ester (C1), 5.9 wt % of the plasticizer (P1), 64 wt % of the structure-forming agent (S1), and 0.1 wt % of the antioxidant (O1), the composition of the resin composition (b) for the layer (B) was changed to 35 wt % of the cellulose ester (C3), 15.9 wt % of the plasticizer (P1), 49 wt % of the structure-forming agent (S1), and 0.1 wt % of the antioxidant (O1), the heat treatment time was changed to 150 seconds, and the heat treatment temperature was changed to 160° C. The structure and physical properties of the obtained composite hollow-fiber membrane were shown in Table 1.

Example 7

A composite hollow-fiber membrane was obtained in the same manner as Example 1 except that the composition of the resin composition (a) for the layer (A) was changed to 65 wt % of the cellulose ester (C1), 9.9 wt % of the plasticizer (P1), 25 wt % of the structure-forming agent (S1), and 0.1 wt % of the antioxidant (O1), the composition of the resin composition (b) for the layer (B) was changed to 60 wt % of the cellulose ester (C2), 15.9 wt % of the plasticizer (P1), 24 wt % of the structure-forming agent (S1), and 0.1 wt % of the antioxidant (O1), and the heat treatment time was changed to 180 seconds. The structure and physical properties of the obtained composite hollow-fiber membrane were shown in Table 1.

Example 8

A composite hollow-fiber membrane was obtained in the same manner as Example 1 except that the composition of the resin composition (a) for the layer (A) was changed to 65 wt % of the cellulose ester (C1), 9.9 wt % of the plasticizer (P1), 25 wt % of the structure-forming agent (S1), and 0.1 wt % of the antioxidant (O1), and the composition of the resin composition (b) for the layer (B) was changed to 25 wt % of the cellulose ester (C2), 15.9 wt % of the plasticizer (P1), 59 wt % of the structure-forming agent (S1), and 0.1 wt % of the antioxidant (O1). The structure and physical properties of the obtained composite hollow-fiber membrane were shown in Table 1.

Example 9

A composite hollow-fiber membrane was obtained in the same manner as Example 1 except that the composition of the resin composition (a) for the layer (A) was changed to 70 wt % of the cellulose ester (C 1), 9.9 wt % of the plasticizer (P1), 20 wt % of the structure-forming agent (S1), and 0.1 wt % of the antioxidant (O1), the composition of the resin composition (b) for the layer (B) was changed to 25 wt % of the cellulose ester (C2), 15.9 wt % of the plasticizer (P1), 59 wt % of the structure-forming agent (S1), and 0.1 wt % of the antioxidant (O1), the heat treatment time was changed to 150 seconds, and the relaxation rate was changed to 5%. The structure and physical properties of the obtained composite hollow-fiber membrane were shown in Table 1.

Example 10

A composite hollow-fiber membrane was obtained in the same manner as Example 1 except that the composition of the resin composition (a) for the layer (A) was changed to 65 wt % of the cellulose ester (C1), 9.9 wt % of the plasticizer (P1), 25 wt % of the structure-forming agent (S1), and 0.1 wt % of the antioxidant (O1), the composition of the resin composition (b) for the layer (B) was changed to 25 wt % of the cellulose ester (C2), 15.9 wt % of the plasticizer (P1), 59 wt % of the structure-forming agent (S1). and 0.1 wt % of the antioxidant (O1), and the heat treatment time was changed to 180 seconds. The structure and physical properties of the obtained composite hollow-fiber membrane were shown in Table 1.

Example 11

A composite hollow-fiber membrane was obtained in the same manner as Example 1 except that the composition of the resin composition (a) for the layer (A) was changed to 45 wt % of the cellulose ester (C1), 24.9 wt % of the plasticizer (P1), 30 wt % of the structure-forming agent (S1), and 0.1 wt % of the antioxidant (O1), and the composition of the resin composition (b) for the layer (B) was changed to 25 wt % of the cellulose ester (C2), 15.9 wt % of the plasticizer (P1), 59 wt % of the structure-forming agent (S1), and 0.1 wt % of the antioxidant (O1). The structure and physical properties of the obtained composite hollow-fiber membrane were shown in Table 2.

Example 12

A composite hollow-fiber membrane was obtained in the same manner as Example 1 except that the composition of the resin composition (a) for the layer (A) was changed to 65 wt % of the cellulose ester (C1), 9.9 wt % of the plasticizer (P1), 25 wt % of the structure-forming agent (S1), and 0.1 wt % of the antioxidant (O1), the composition of the resin composition (b) for the layer (B) was changed to 20 wt % of the cellulose ester (C2), 15.9 wt % of the plasticizer (P1), 64 wt % of the structure-forming agent (S1), and 0.1 wt % of the antioxidant (O1), the extrusion rate of the resin composition (a) was changed to 10.6 g/min and the extrusion rate of the resin composition (b) was changed to 15.8 g/min with a gear pump. The structure and physical properties of the obtained composite hollow-fiber membrane were shown in Table 2.

Example 13

A composite hollow-fiber membrane was obtained in the same manner as Example 1 except that the composition of the resin composition (a) for the layer (A) was changed to 65 wt % of the cellulose ester (C1), 9.9 wt % of the plasticizer (P1), 25 wt % of the structure-forming agent (S1), and 0.1 wt % of the antioxidant (O1), the composition of the resin composition (b) for the layer (B) was changed. to 20 wt % of the cellulose ester (C2), 15.9 wt % of the plasticizer (P1), 64 wt % of the structure-forming agent (S1), and 0.1 wt % of the antioxidant (O1), and the extrusion rate of the resin composition (a) was changed to 7.9 g/min and the extrusion rate of the resin composition (b) was changed to 18.5 g/min with a gear pump. The structure and physical properties of the obtained composite hollow-fiber membrane were shown in Table 2.

Example 14

A composite hollow-fiber membrane was obtained in the same manner as Example 1 except that the composition of the resin composition (a) for the layer (A) was changed to 70 wt % of the cellulose ester (C1), 9.9 wt % of the plasticizer (P1), 20 wt % of the structure-forming agent (S1), and 0.1 wt % of the antioxidant (O1), the composition of the resin composition (b) for the layer (B) was changed to 35 wt % of the cellulose ester (C2), 15.9 wt % of the plasticizer (P1), 49 wt % of the structure-forming agent (S1), and 0.1 wt % of the antioxidant (O1), the heat treatment time was changed to 150 seconds, and the relaxation rate was changed to 5%. The structure and physical properties of the obtained composite hollow-fiber membrane were shown in Table 2.

Example 15

A composite hollow-fiber membrane was obtained in the same manner as Example 1 except that the composition of the resin composition (a) for the layer (A) was changed to 50 wt % of the cellulose ester (C1), 24.9 wt % of the plasticizer (P1), 25 wt % of the structure-forming agent (S1), and 0.1 wt % of the antioxidant (O1), the composition of the resin composition (b) for the layer (B) was changed to 45 wt % of the cellulose ester (C3), 15.9 wt % of the plasticizer (P1), 39 wt % of the structure-forming agent (S1), and 0.1 wt % of the antioxidant (O1), and the draft ratio was changed to 100. The structure and physical properties of the obtained composite hollow-fiber membrane were shown in Table 2.

Example 16

A composite hollow-fiber membrane was obtained in the same manner as Example 1 except that the composition of the resin composition (a) for the layer (A) was changed to 50 wt % of the cellulose ester (C1), 24.9 wt % of the plasticizer (P1), 25 wt % of the structure-forming agent (S1), and 0.1 wt % of the antioxidant (O1), the composition of the resin composition (b) for the layer (B) was changed to 45 wt % of the cellulose ester (C3), 15.9 wt % of the plasticizer (P1), 39 wt % of the structure-forming agent (S1), and 0.1 wt % of the antioxidant (O1), and the draft ratio was changed to 200. The structure and physical properties of the obtained composite hollow-fiber membrane were shown in Table 2.

Example 17

A composite hollow-fiber membrane was obtained in the same manner as Example 1 except that the composition of the resin composition (a) for the layer (A) was changed to 50 wt % of the cellulose ester (C1), 24.9 wt % of the plasticizer (P1), 25 wt % of the structure-forming agent (S1), and 0.1 wt % of the antioxidant (O1), the composition of the resin composition (b) for the layer (B) was changed to 45 wt % of the cellulose ester (C3), 15.9 wt % of the plasticizer (P1), 39 wt % of the structure-forming agent (S1), and 0.1 wt % of the antioxidant (O1), and the draft ratio was changed to 400. The structure and physical properties of the obtained composite hollow-fiber membrane were shown in Table 2.

Example 18

50 wt % of the polyamide (A1), 5.5 wt % of the plasticizer (P1), 44 wt % of the structure-forming agent (S1), and 0.5 wt % of the antioxidant (O2) were melt-kneaded at 260° C. with a twin-screw extruder, homogenized and then pelletized, to obtain a resin composition (a) for a layer (A). The pellets were vacuum-dried at 80° C. for 8 hours.

In addition, 25 wt % of the polyamide (A1), 15.5 wt % of the plasticizer (P1), 49 wt % of the structure-forming agent (S2), and 0.5 wt % of the antioxidant (O2) were melt-kneaded at 260° C. with a twin-screw extruder, homogenized and then pelletized, to obtain a resin composition (b) for a layer (B). The pellets were vacuum-dried at 80° C. for 8 hours.

The pellets of the resin composition (a) for the layer (A) and the pellets of the resin composition (b) for the layer (B) were supplied to separate twin-screw extruders and melt-kneaded at 240° C., and then an extrusion rate of the resin composition (a) was adjusted to 2.9 g/min and an extrusion rate of the resin composition (b) was adjusted to 23.5 g/min using a gear pump. Then, the resin compositions were introduced into a spinning spinneret pack having a multiple annular nozzle having a gas flow channel at the center such that the outer layer was the layer (A) and the inner layer was the layer (B), to be composited in the spinneret. The temperature of the spinning spinneret pack was 220° C., the discharge hole diameter was 8.3 mm, the slit width was 1.1 mm, and the number of holes was 1.

The spun hollow-fiber membranes were introduced to a cooling apparatus (chimney) such that a distance L from the lower surface of the spinneret to the upper end of the cooling apparatus was 30 mm, were cooled with cooling air at 25° C. and an air speed of 1.5 m/sec, and were wound by a winder such that the draft ratio was 60.

The spun yarn was subjected to heat treatment at 180° C. for 600 seconds while being subjected to 10% relaxation in the lengthwise direction, and then the composite hollow-fiber membrane was immersed in a 50% aqueous ethanol solution for 12 hours to elute the plasticizer and the structure-forming agent. The physical properties of the obtained composite hollow-fiber membrane were shown in Table 2.

Example 19

A composite hollow-fiber membrane was obtained in the same manner as Example 18 except that the composition of the resin composition (a) for the layer (A) was changed to 65 wt % of the polyamide (A1), 5.5 wt % of the plasticizer (P1), 29 wt % of the structure-forming agent (S1), and 0.5 wt % of the antioxidant (O2), and the composition of the resin composition (b) for the layer (B) was changed to 25 wt % of the polyamide (A1), 15.5 wt % of the plasticizer (P1), 49 wt % of the structure-forming agent (S2), and 0.5 wt % of the antioxidant (O2). The structure and physical properties of the obtained composite hollow-fiber membrane were shown in Table 2.

Example 20

A composite hollow-fiber membrane was obtained in the same manner as Example 18 except that the composition of the resin composition (a) for the layer (A) was changed to 65 wt % of the polyamide (A2), 5.5 wt % of the plasticizer (P1), 29 wt % of the structure-forming agent (S1), and 0.5 wt % of the antioxidant (O2), the composition of the resin composition (b) for the layer (B) was changed to 30 wt % of the polyamide (A2), 15.5 wt % of the plasticizer (P1). 54 wt % of the structure-forming agent (S2), and 0.5 wt % of the antioxidant (O2), and the heat treatment temperature was changed to 150° C. The structure and physical properties of the obtained composite hollow-fiber membrane were shown in Table 2.

Comparative Example 1

A hollow-fiber membrane substantially composed of only the layer (A) was obtained in the same manner as Example 1 except that the composition of the resin composition (a) for the layer (A) and the composition of the resin composition (b) for the layer (B) were each changed to 60 wt % of the cellulose ester (C1), 19.9 wt % of the plasticizer (P1), 20 wt % of the structure-forming agent (S1), and 0.1 wt % of the antioxidant (O1). The structure and physical properties of the obtained hollow-fiber membrane were shown in Table 2.

TABLE 1

| | | | | Example 1 | Example 2 | Example 3 | Example 4 | Example 5 |
|---|---|---|---|---|---|---|---|---|
| Structure of composite hollow-fiber membrane | Layer (A) | Structure period ($D_A$) | nm | 140 | 28 | 95 | 270 | 430 |
| | | (a)/(b) | — | 13.5 | 1.21 | 1.30 | 1.23 | 1.33 |
| | | Thickness | μm | 12 | 12 | 12 | 12 | 13 |
| | | Opening ratio $H_A$ | % | 31 | 20 | 27 | 47 | 51 |
| | Layer (B) | Structure period ($D_{B1}$) or pore diameter ($D_{B2}$) | nm | 483 | 487 | 491 | 930 | 1350 |
| | | (a)/(b) | — | 1.21 | 1.19 | 1.20 | 1.26 | 1.42 |
| | | Opening ratio $H_B$ | % | 48 | 40 | 47 | 54 | 57 |
| | | Determination of structure | — | Co-continuous structure | Co-continuous structure | Co-continuous structure | Co-continuous structure | Co-continuous structure |

TABLE 1-continued

|  |  |  |  | | | | |
|---|---|---|---|---|---|---|---|
|  | $(D_{B1}$ or $D_{B2})/D_A$ | — | 3.45 | 17.39 | 5.17 | 3.44 | 3.14 |
|  | $H_B/H_A$ | — | 1.55 | 2.00 | 1.74 | 1.15 | 1.12 |
|  | Layer constitution (outer layer/inner layer) | — | A/B | A/B | A/B | A/B | A/B |
|  | Outer diameter | μm | 782 | 803 | 795 | 829 | 836 |
|  | Thickness of membrane | μm | 115 | 120 | 118 | 130 | 138 |
| Properties of composite hollow-fiber membrane | Membrane permeation flux | m³/m²/hr | 0.62 | 0.31 | 0.53 | 1.10 | 1.30 |
|  | Tensile strength | MPa | 12 | 16 | 13 | 12 | 11 |

|  |  |  | Example 6 | Example 7 | Example 8 | Example 9 | Example 10 |
|---|---|---|---|---|---|---|---|
| Structure of composite hollow-fiber membrane | Layer (A) Structure period $(D_A)$ | nm | 960 | 42 | 10 | 17 | 11 |
|  | (a)/(b) | — | 1.43 | 0.95 | 1.09 | 0.89 | 0.97 |
|  | Thickness | μm | 12 | 12 | 12 | 12 | 12 |
|  | Opening ratio $H_A$ | % | 52 | 18 | 18 | 11 | 18 |
|  | Layer (B) Structure period $(D_{B1})$ or pore diameter $(D_{B2})$ | nm | 1950 | 316 | 911 | 682 | 724 |
|  | (a)/(b) | — | 1.46 | 1.16 | — | — | — |
|  | Opening ratio $H_B$ | % | 56 | 32 | 73 | 64 | 66 |
|  | Determination of structure | — | Co-continuous structure | Co-continuous structure | Three-dimensional network structure | Three-dimensional network structure | Three-dimensional network structure |
|  | $(D_{B1}$ or $D_{B2})/D_A$ | — | 2.03 | 7.52 | 91.10 | 40.12 | 65.82 |
|  | $H_B/H_A$ | — | 1.08 | 1.78 | 4.06 | 5.82 | 3.67 |
|  | Layer constitution (outer layer/inner layer) | — | A/B | A/B | A/B | A/B | A/B |
|  | Outer diameter | μm | 831 | 803 | 793 | 786 | 790 |
|  | Thickness of membrane | μm | 134 | 120 | 116 | 112 | 115 |
| Properties of composite hollow-fiber membrane | Membrane permeation flux | m³/m²/hr | 1.43 | 0.15 | 0.68 | 0.33 | 0.18 |
|  | Tensile strength | MPa | 10 | 25 | 12 | 13 | 13 |

TABLE 2

|  |  |  | Example 11 | Example 12 | Example 13 | Example 14 | Example 15 | Example 16 |
|---|---|---|---|---|---|---|---|---|
| Structure of composite hollow-fiber membrane | Layer (A) Structure period $(D_A)$ | nm | 145 | 43 | 43 | 16 | 93 | 93 |
|  | (a)/(b) | — | 1.27 | 1.08 | 1.08 | 0.87 | 1.27 | 1.27 |
|  | Thickness | μm | 12 | 47 | 36 | 12 | 9 | 6 |
|  | Opening ratio $H_A$ | % | 32 | 19 | 19 | 11 | 26 | 28 |
|  | Layer (B) Structure period $(D_{B1})$ or pore diameter $(D_{B2})$ | nm | 921 | 1160 | 1139 | 650 | 542 | 546 |
|  | (a)/(b) | — | — | — | — | 1.05 | 1.18 | 1.16 |
|  | Opening ratio $H_B$ | % | 73 | 64 | 63 | 39 | 46 | 47 |
|  | Determination of structure | — | Three-dimensional network structure | Three-dimensional network structure | Three-dimensional network structure | Co-continuous structure | Co-continuous structure | Co-continuous structure |
|  | $(D_{B1}$ or $D_{B2})/D_A$ | — | 6.35 | 26.98 | 26.49 | 40.63 | 5.38 | 5.87 |
|  | $H_B/H_A$ | — | 2.28 | 3.37 | 3.32 | 3.55 | 1.77 | 1.68 |
|  | Layer constitution (order layer/inner layer) | — | A/B | A/B | A/B | A/B | A/B | A/B |

TABLE 2-continued

|  |  |  |  |  |  |  |  |  |
|---|---|---|---|---|---|---|---|---|
|  | Outer diameter | μm | 794 | 813 | 810 | 807 | 617 | 431 |
|  | Thickness of membrane | μm | 117 | 118 | 116 | 119 | 89 | 64 |
| Properties of composite hollow-fiber membrane | Membrane permeation flux | m³/m²/hr | 1.17 | 0.24 | 0.24 | 0.17 | 0.57 | 0.63 |
|  | Tensile strength | MPa | 10 | 21 | 21 | 16 | 13 | 12 |

|  |  |  |  | Example 17 | Example 18 | Example 19 | Example 20 | Comparative example 1 |
|---|---|---|---|---|---|---|---|---|
| Structure of composite hollow-fiber membrane | Layer (A) | Structure period ($D_A$) | nm | 96 | 108 | 91 | 97 | 29 |
|  |  | (a)/(b) | — | 1.26 | 1.24 | 1.11 | 0.97 | 1.18 |
|  |  | Thickness | μm | 4 | 23 | 23 | 19 | 119 |
|  |  | Opening ratio $H_A$ | % | 27 | 37 | 27 | 31 | 20 |
|  | Layer (B) | Structure period ($D_{B1}$) or pore diameter ($D_{B2}$) | nm | 587 | 454 | 462 | 553 | — |
|  |  | (a)/(b) | — | 1.14 | — | — | 1.28 | — |
|  |  | Opening ratio $H_B$ | % | 47 | 51 | 52 | 54 | — |
|  |  | Determination of structure | — | Co-continuous structure | Co-continuous structure | Co-continuous structure | Co-continuous structure | — |
|  | ($D_{B2}$ or $D_{B2}$)/$D_A$ |  | — | 6.11 | 4.20 | 5.08 | 5.70 | — |
|  | $H_B$/$H_A$ |  | — | 1.74 | 1.38 | 1.93 | 1.74 | — |
|  | Layer constitution (order layer/inner layer) |  | — | A/B | A/B | A/B | A/B | A |
|  | Outer diameter |  | μm | 315 | 917 | 928 | 891 | 800 |
|  | Thickness of membrane |  | μm | 43 | 162 | 163 | 159 | 119 |
| Properties of composite hollow-fiber membrane | Membrane permeation flux |  | m³/m²/hr | 0.67 | 0.51 | 0.31 | 0.34 | 0.06 |
|  | Tensile strength |  | MPa | 12 | 18 | 20 | 18 | 19 |

The composite hollow-fiber membranes of Examples 1 to 20 all had a co-continuous structure in the layer (A). Further, from the results of Table 1, in all of the composite hollow-fiber membranes of Examples 1 to 20, the membrane permeation flux was 0.1 m³/m²/h or more, and the tensile strength was 10 MPa or more, thus good permeation performance and membrane strength were exerted.

On the other hand, in the hollow-fiber membrane of Comparative Example 1, the membrane permeation flux was insufficient.

INDUSTRIAL APPLICABILITY

The present invention relates to a composite hollow-fiber membrane having high permeation performance and high membrane strength. The composite hollow-fiber membrane according to the present invention can be used for water treatment membranes to produce industrial water and drinking water from seawater, brackish water, sewage water, waste water etc., medical membranes for artificial kidneys and plasma separation, membranes for food and beverage industry such as fruit juice concentration, gas separation membranes for separating exhaust gas or carbon dioxide, and electronics industry membranes such as fuel cell separators. As the type of the water treatment membrane, a microfiltration membrane, an ultrafiltration membrane or the like can be preferably used.

Although the present invention has been described in detail using specific embodiments, it will be apparent to those skilled in the art that various modifications and variations are possible without departing from the spirit and scope of the present invention.

This application is based on Japanese Patent Application filed on Feb. 28, 2017 (Japanese Patent Application No. 2017-036089), the entirety of which is incorporated by reference.

The invention claimed is:

1. A composite hollow-fiber membrane comprising at least a layer (A) and a layer (B), wherein
the layer (A) and the layer (B) contain a cellulose ester or a polyamide resin,
the layer (A) contains a co-continuous structure including a phase containing the cellulose ester or the polyamide resin, and voids,
the co-continuous structure has a structure period of 1 nm to 1000 nm,
an opening ratio $H_A$ of the layer (A) and an opening ratio $H_B$ of the layer (B) satisfy $H_A < H_B$,
the layer (A) is an outermost layer, and
in a graph with horizontal axis for wavenumber and vertical axis for intensity, which is obtained by Fourier transformation of a microscopic image photographed in a square visual field with each side having a length 10 times to 100 times the structure period of the co-continuous structure of the layer (A), when a peak half width is set as (a) and a peak maximum wavenumber is set as (b) in the graph, a region defined by $0 < (a)/(b) \leq 1.5$ is included in the composite hollow-fiber membrane.

2. The composite hollow-fiber membrane according to claim 1, wherein the layer (A) has a thickness of 1 μm to 50 μm.

3. The composite hollow-fiber membrane according to claim 1, wherein the layer (B) comprises a spherical structure or a three-dimensional network structure.

4. The composite hollow-fiber membrane according to claim 1, wherein the composite hollow-fiber membrane has a thickness of 10 μm to 500 μm.

5. The composite hollow-fiber membrane according to claim 1, wherein the composite hollow-fiber membrane has an outer diameter of 50 μm to 2,500 μm.

6. A method for producing a composite hollow-fiber membrane having two or more layers, comprising the following steps of (1) to (5):
   (1) a melting step of heating a resin composition constituting each layer of the composite hollow-fiber membrane, wherein the resin composition constituting at least one layer contains a cellulose ester or a polyamide resin, and at least one compound selected from the group consisting of a polyvinylpyrrolidone (PVP) and a PVP/vinyl acetate copolymer;
   (2) a compositing step of running the melted resin compositions of the respective layers together in a spinneret having a multiple annular nozzle in which a gas flow channel is disposed at a central portion;
   (3) a molding step of discharging the composited resin composition from the multiple annular nozzle into air to obtain a hollow-fiber molded product;
   (4) a co-continuous structure forming step of performing phase separation to form a co-continuous structure, which comprises a first phase containing the cellulose ester or polyamide resin and a second phase containing a structure-forming agent of PVP or a PVP/vinyl acetate copolymer in the layer constituted by the resin composition containing the cellulose ester or polyamide resin and the structure-forming agent in the hollow-fiber molded product; and
   (5) an eluting step of eluting the structure-forming agent.

* * * * *